INVENTOR.
WILLIAM PECHY

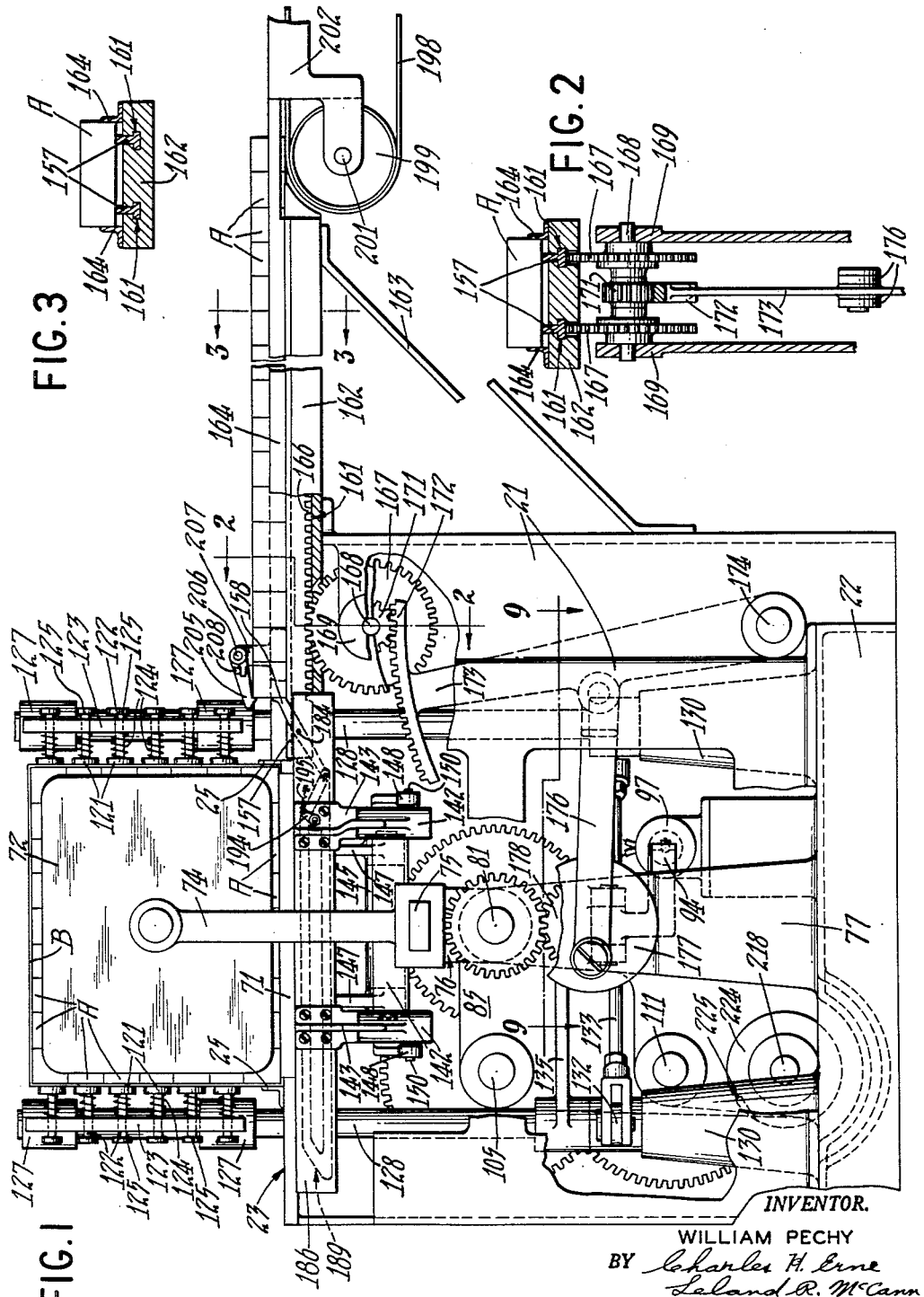

June 14, 1960 W. PECHY 2,940,636
MACHINE FOR UNLOADING ARTICLES FROM CONTAINERS
Filed July 20, 1955 7 Sheets-Sheet 3

INVENTOR.
WILLIAM PECHY
BY Charles H. Crne
Leland R. McCann
George W. Reiter
ATTORNEYS June 14, 1960 W. PECHY 2,940,636
MACHINE FOR UNLOADING ARTICLES FROM CONTAINERS
Filed July 20, 1955 7 Sheets-Sheet 4
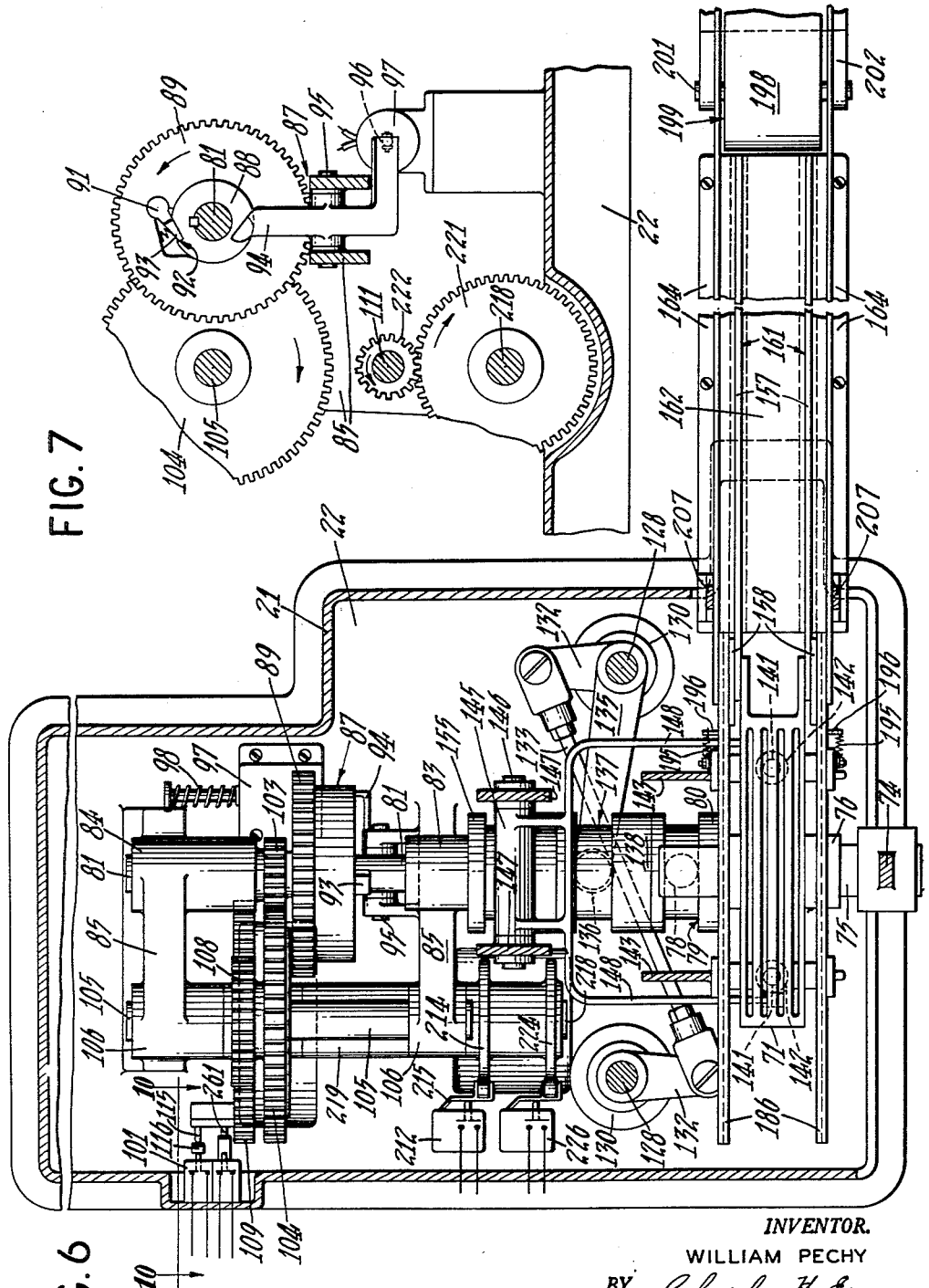
INVENTOR.
WILLIAM PECHY
BY Charles H. Erne
Leland R. McCann
George W. Reiber
ATTORNEYS

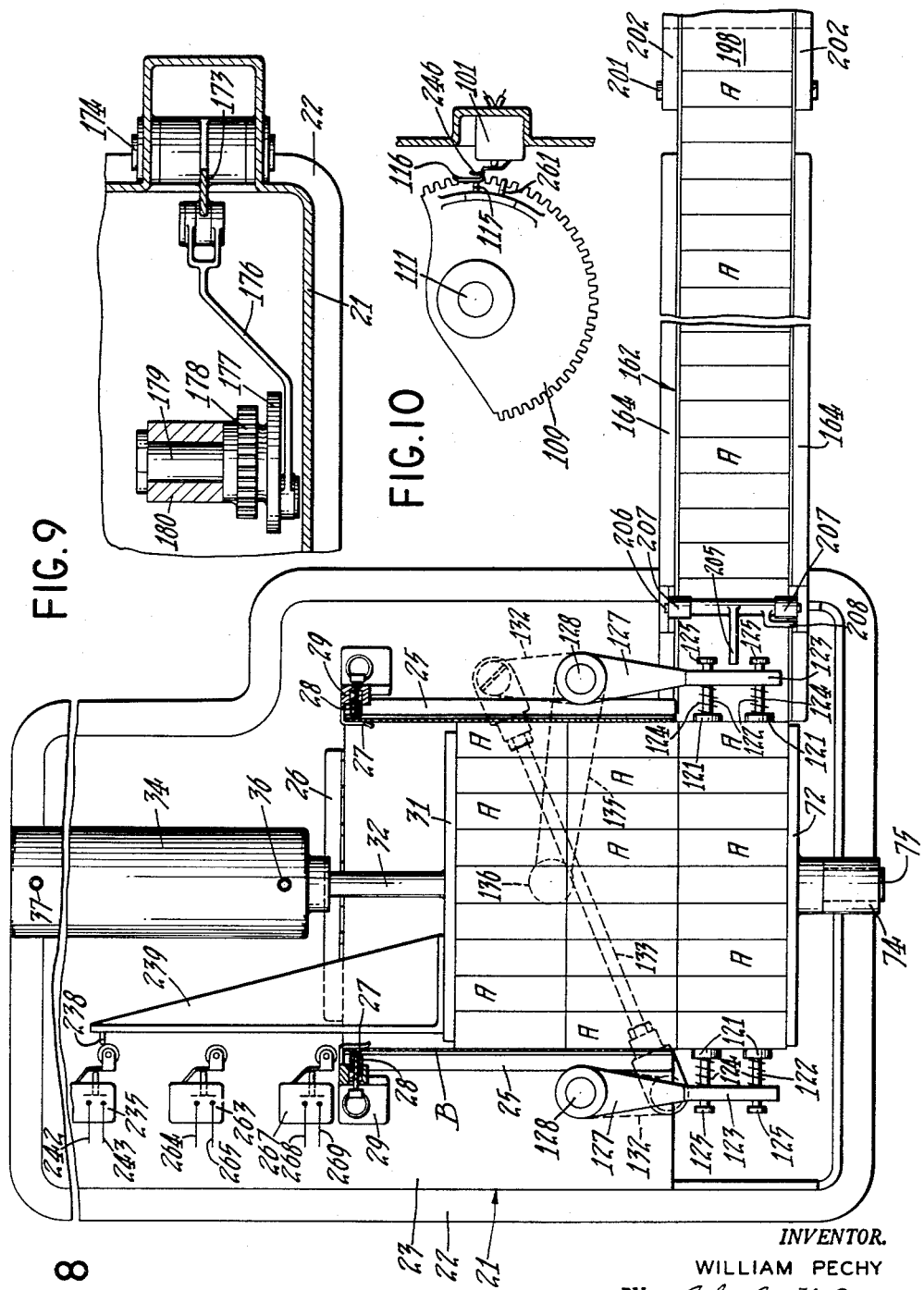

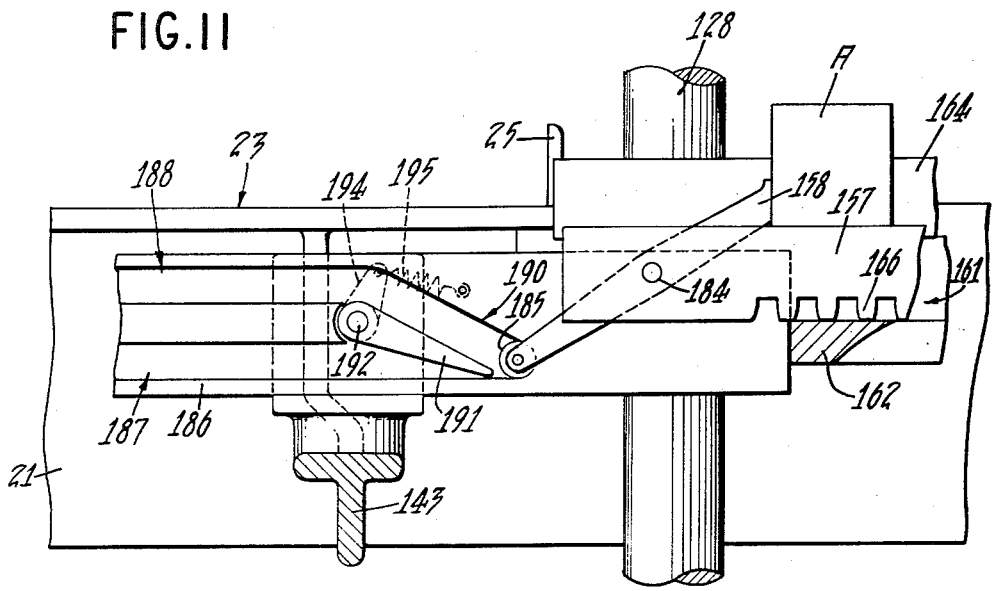
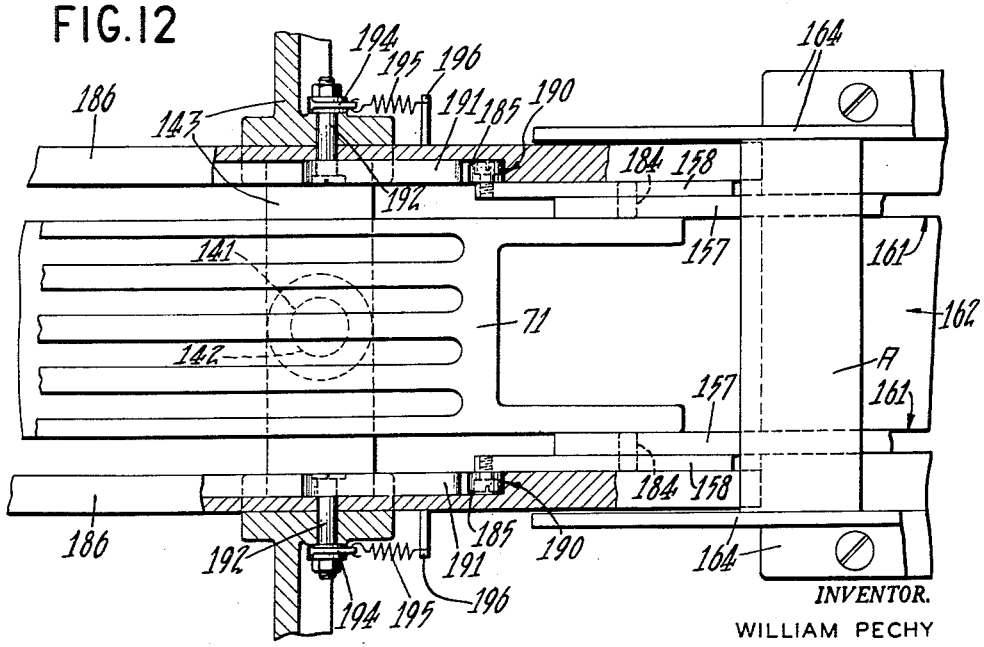

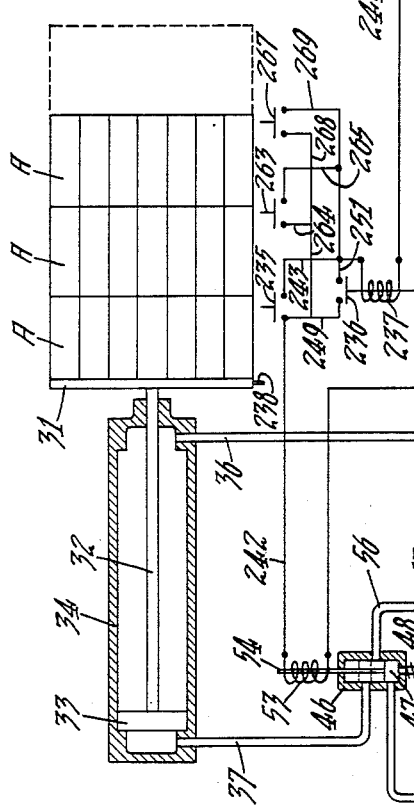

United States Patent Office 2,940,636
Patented June 14, 1960

2,940,636
MACHINE FOR UNLOADING ARTICLES FROM CONTAINERS

William Pechy, Belmar, N.J., assignor to American Can Company, New York, N.Y., a corporation of New Jersey Filed July 20, 1955, Ser. No. 523,267

4 Claims. (Cl. 221—104)

The present invention relates to a machine for automatically unloading articles such as rectangular fibre milk containers from shipping carriers such as paper bags or cartons in which the articles are arranged in parallel rows and vertically stacked layers and has particular reference to devices for unloading the articles in an orderly manner in separate rows for advancement in a substantially continuous procession from the unloading machine to a subsequent operation or receiving machine.

In order to maintain empty fibre milk containers in sanitary condition during shipment and storage prior to filling with milk at a dairy, they usually are packed in large paper bags or carriers which are sealed against the entrance of any contaminating mediums. The containers are packed in the carriers in orderly fashion, usually in juxtaposed and superimposed rows to form stacked layers to protect the containers against damage during shipment and to occupy a minimum space during storage.

When the containers are to be filled with milk, the carriers are opened and the containers removed and arranged in a substantially continuous row for feeding in processional order into a filling machine. These operations usually are performed manually by operators who must keep the feed-in substantially continuous for efficient results.

It is an object of the instant invention to provide an automatic unloading machine for the above purpose to insure substantially continuous feed of the containers to the filling machine.

Another object is the provision of such a machine which handles the containers gently so as to prevent damage to the containers and which handles them in an orderly fashion so as to insure proper location and position of the containers upon reception in the filling machine.

Another object is the provision of such a machine which readily handles the containers under high speed operating conditions so as to keep pace with high speed filling machines.

Numerous other objects and advantages of the invention will be apparent as it is better understood from the following description, which, taken in connection with the accompanying drawings, discloses a preferred embodiment thereof.

Referring to the drawings:

Figure 1 is a front view of an unloading machine embodying the instant invention, with parts broken away;

Figs. 2 and 3 are transverse sectional views taken substantially along the broken line 2—2 and the line 3—3 respectively in Fig. 1, parts being broken away;

Fig. 6 is a horizontal sectional plan view taken substantially along the line 6—6 in Fig. 5, with parts broken away;

Fig. 7 is a fragmentary sectional view taken substantially along the broken line 7—7 in Fig. 5;

Fig. 8 is a top plan view of the machine shown in Fig. 1, with parts broken away;

Fig. 9 is a fragmentary sectional view taken substantially along the broken line 9—9 in Fig. 1;

Fig. 10 is a fragmentary sectional view taken substantially along the line 10—10 in Fig. 6;

Fig. 11 is an enlarged fragmentary section taken substantially along the line 11—11 in Fig. 5;

Fig. 12 is an enlarged plan view of a portion of the machine shown at the lower left in Fig. 6, parts being broken back and shown in section;

Fig. 13 is a diagrammatic view showing principal parts of the machine, including an electric wiring diagram and a hydraulic piping system used in the machine; and Fig. 14 is a sectional detail taken substantially along the line 14—14 in Fig. 5.

Figure 4:
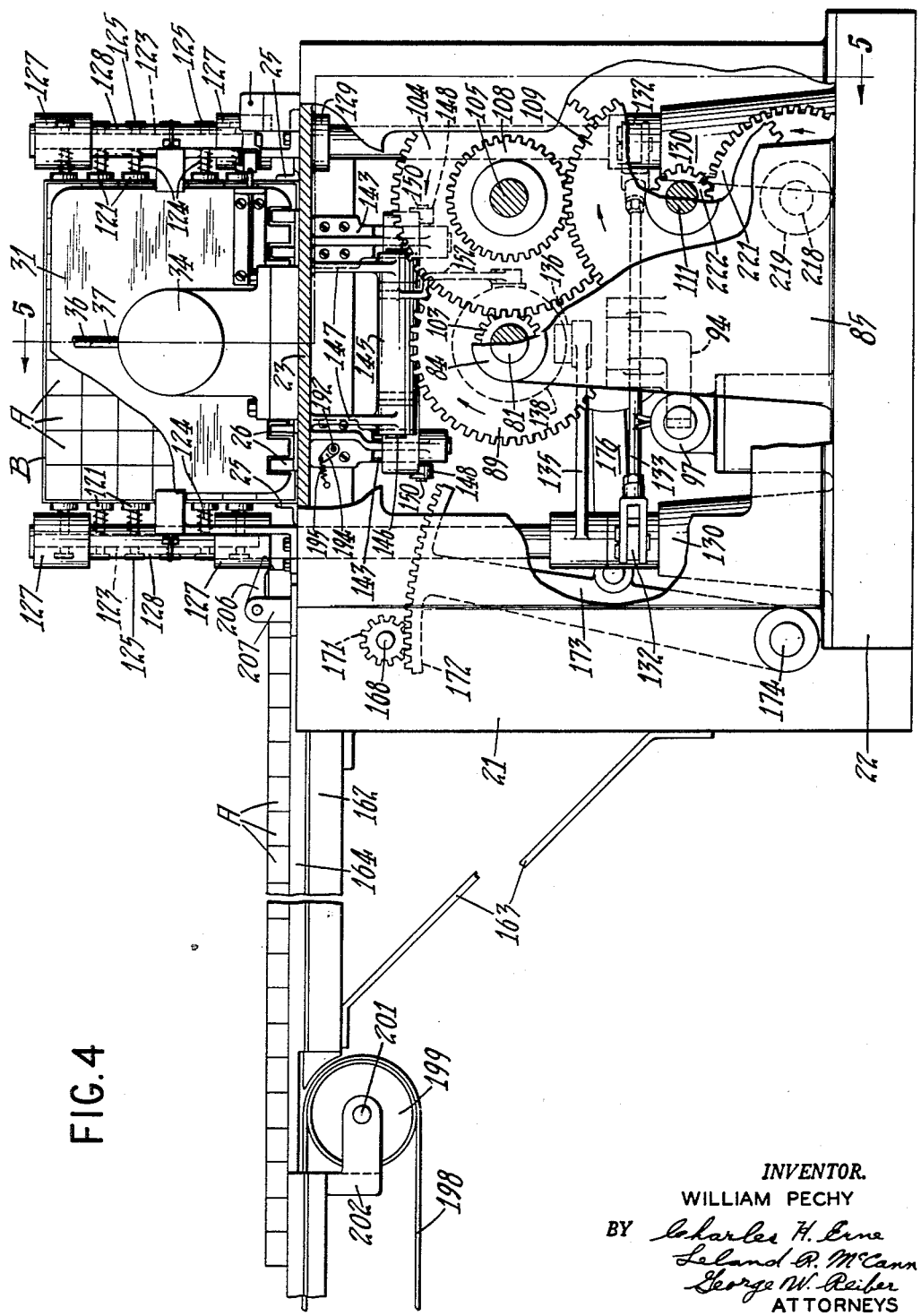
Fig. 4 is a rear view of the machine shown in Fig. 1, with parts broken away.

As a preferred or exemplary embodiment of the invention the drawings illustrate a machine for automatically unloading rectangular fibre milk containers A (Figs. 1, 5 and 8) such as disclosed in United States Patent 2,085,979, issued July 6, 1937, to John M. Hothersall, from rectangular paper bags or carriers B in which the containers are arranged in horizontal parallel rows and vertically stacked layers. In the drawings each bag B is shown, by way of example, as holding seven layers of containers A lying on their sides, each layer comprising three horizontal parallel rows of nine juxtaposed containers each, the rows of each layer being arranged vertically in three juxtaposed stacks, to provide stacks of a plurality of single rows of containers.

Figure 5:
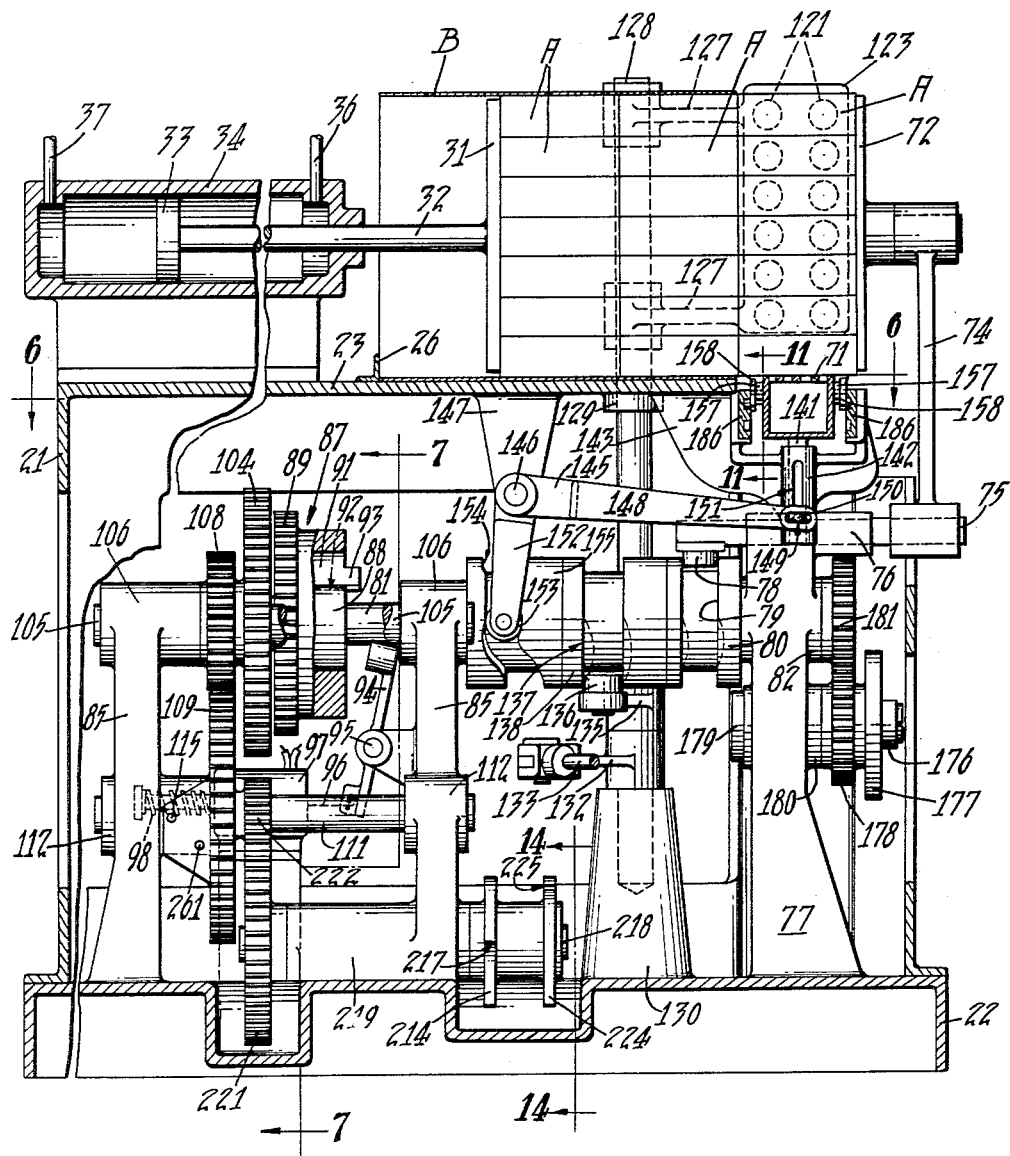
Fig. 5 is a transverse vertical section taken substantially along the broken line 5—5 in Fig. 4, with parts broken away.

In unloading the containers A from the bags B, the sealed bag preferably is positioned in the machine in an on-side position, with the containers lying on their sides and extending in an endwise direction transversely of the machine as shown in Fig. 5. The two ends of the bag are cut off, preferably before entry into the machine, to expose the outer ends of the two outer stacks of the containers.

With the containers A in this position in the open ended bag, the entire contents of the bag are pushed partially through to push one stack out of the bag and expose it for feeding row-by-row until the entire stack is disposed of. A repeat operation is then performed on the next stack, and finally on the third or last stack to thus completely unload the bag.

As each stack is exposed, preferably all containers above the lowermost row are clamped in place while the lowermost row is removed from under the stack and advanced along a predetermined line of travel to take its place in and thus form a substantially continuous procession of the containers advancing toward the filling machine. Upon complete removal of the lowermost row from the stack, the rows above are unclamped and lowered a distance equal to the height of one row to position the row next above in the place of and to constitute a new lowermost row. The remaining rows above are then reclamped to permit removal of the lowermost row. Through a repetition of this procedure the entire stack is disposed of row-by-row. A new stack is pushed into place to be disposed of row-by-row in the same manner described above, as soon as one stack is unloaded.

The machine for unloading the containers A from the carriers B in the manner described above, comprises a novel combination of machine elements mounted on and in a generally rectangular main frame 21 (Figs. 1, 4, 5, 6 and 8) secured to a base plate 22. The top of the frame 21 is flat and horizontal and constitutes a bed 23 on which the carrier B is received for unloading. A pair of spaced and parallel guide rails 25 (Figs. 1 and 8) extending transversely of the machine and a longitudinal rail 26 disposed adjacent the outer ends of the rails 25 are secured to the machine bed 23 to locate the carrier B in place while being unloaded. The carrier B is held against movement during removal of the container by clips 27 (Fig. 8) which fit inside the outer marginal edge portion of the carrier and by spring plungers 28 disposed outside the carrier opposite the clips to clamp the carrier therebetween. The clips 27 and plungers 28 are mounted in brackets 29 secured to the bed 23 adjacent the outer end of the carrier.

Pushing of the stacks of containers A out of the carrier B through its inner open end preferably is effected by a horizontally reciprocable pusher plate 31 (Figs. 4, 5, and 8) which is located adjacent the outer open end of the carrier B and is adapted to move into the carrier. The plate 31 preferably is rectangular in configuration and at its lower edge is tessellated to clear a similar edge on the outer guide rail 26 (Fig. 4). This plate 31 is mounted on one end of a horizontally disposed piston rod 32 arranged in endwise or axial alignment with the open ends of the carrier B. The opposite or outer end of the piston rod 32 carries a piston 33 (see Fig. 5) which operates in a cylinder 34 mounted on the machine bed 23.

The pusher plate 31 is advanced into and through the carrier B in partial, short strokes equal to the length of the containers A to push each stack of containers out of the inner end of the carrier. This is effected through a fluid pressure medium, such as oil or other suitable fluid acting upon the piston 33 in the cylinder 34. For this purpose the ends of the cylinder 34 are connected to and communicate with a pair of main feed pipes 36, 37 of a hydraulic or fluid pressure system diagrammatically shown in Fig. 13.

The feed pipe 36 leads from the cylinder 34 to one end of a slide valve housing 38 (Fig. 13) containing a horizontally movable slide valve 39. The shifting of the slide valve 39 is controlled by a pair of electric solenoids 41, 42 which are located outside the housing 38 and which surround respective core bars 43, 44 which extend from the ends of the slide valve and project outside the housing.

The feed pipe 37 leads from the cylinder 34 to a cutoff valve housing 46 containing a vertically movable cutoff valve 47 normally disposed in the bottom of the housing as shown in Fig. 13. The valve 47 is retained in this position under tension of a spring 48 disposed outside the valve housing and interposed between the housing and a head 49 of a stud 50 attached to the lower end of the cutoff valve 47. Vertical movement of the valve 47 is controlled by an electric solenoid 53 disposed outside the valve housing 46 and surrounding a core rod 54 attached to the valve.

The interior of the cutoff valve housing 46 above the normal position of the valve 47 communicates with one end of a pipe 56 which at its opposite end communicates with the interior of the slide valve housing 38 at the end of the latter housing opposite the pipe 36. Between the two pipes 36, 56 and on the same side of the slide valve housing 38, the interior of the housing communicates with a main supply pipe 57 which leads from a fluid circulating or feed pump 58. The pump 58 is also connected by a return supply pipe 59 having three return branch pipes 61, 62, 63. The pump 58 preferably is maintained in continuous operation to maintain continuous circulation of the fluid pressure medium through the system.

The branch return pipe 61 leads from the main return pipe 59 to the interior of the cutoff valve housing 46 near the bottom of the housing where its entrance into the housing is normally cut off by the cutoff valve 47. The branch return pipe 62 connects the main return pipe 59 with the main feed pipe 36. This branch return pipe 62 includes a pressure relief valve 64 which permits the fluid pressure medium to flow from the pipe 36 into the return pipe 62 only when too great a pressure is created in the pipe 36 as when the piston 33 reaches the end of a return stroke in the cylinder 34. The branch return pipe 63 connects the main return pipe 59 with the interior of the slide valve housing 38 at a point opposite the supply pipe 57.

To control the reciprocation of the piston 33 in its cylinder 34 through the hydraulic system described above, the slide valve 39 on the side adjacent the feed pipes 36, 56 and supply pipe 57, is formed with a channel or recess 66 of a length sufficient to provide communication between the centrally located supply pipe 57 and one or the other of the two feed pipes 36, 56. On the opposite side of the slide valve 39, i.e. the side adjacent the branch return pipe 63, the valve is provided with a partition fin 67 which is located substantially midway between the ends of the valve.

In operation of this hydraulic system the normal position of the slide valve 39 is that shown in Fig. 13 in which the valve channel 66 provides communication between the supply pipe 57 and the feed pipe 36 and in which the partition fin 67 is located at the right of the branch return pipe 63, establishing communication between the pipe 63 and the feed pipe 56. In this position of the slide valve 39 the pump 58 draws the fluid pressure medium out of the cylinder 34 in the space between the piston 33 and the end of the cylinder at the left (as viewed in Fig. 13) by way of the feed pipe 37, cutoff valve housing 46, feed pipe 56, through the end of the slide valve housing 38 at the left, branch return pipe 63, and main return pipe 59 to return the fluid to the pump.

During this action the pump 58 also forces the fluid pressure medium through the supply pipe 57, channel 66 in the slide valve 39, and feed pipe 36 into the cylinder at the right (as viewed in Fig. 13) for pressure action against the piston 33 to force and temporarily hold the piston in its normal position at the end of the cylinder at the left (as viewed in Fig. 13) in readiness for a working stroke. While the piston 33 is at rest in its normal position, excess pressure created in the cylinder 34 through continuous operation of the pump 58 is relieved by automatic opening of the relief valve 64 which thereupon by-passes the continuously circulating fluid pressure medium through the branch return pipe 62 to the main return pipe 59 to permit the excess pressure medium to return to the pump.

Positioning of a bag or carrier B of the containers A on the bed 23 of the machine is manually effected during this portion of the cycle of operation of the machine while the piston 33 and the pusher plate 31 connected thereto are held in their normal retracted positions by the pressure medium as just explained above and as shown in Fig. 13.

At the proper time in the cycle of operation of the machine, the slide valve solenoid 41 (Fig. 13 at left of slide valve) is energized as will be explained more fully hereinafter in connection with the wiring diagram. This solenoid 41, as well as solenoid 42 are of the type which permit their movable cores 43, 44 to remain in a shifted position upon momentary energization of the solenoid. Hence the slide valve 39 controlled by the solenoids 41, 42 remains in a shifted position until an oppositely disposed solenoid is energized.

The energization of the solenoid 41 shifts the slide valve 39 from the position shown in Fig. 13 to a new position in the end of the slide valve housing 38 at the left (as viewed in Fig. 13). In this new position of the slide valve 39 its channel 66 establishes fluid medium feeding communication between the supply pipe 57 and the feed pipe 56 and also establishes medium return communication between the feed pipe 36 and the branch return pipe 63. Hence the pump 58 circulates the fluid pressure medium through the supply pipe 57, slide valve channel 66, feed pipe 56, cutoff valve housing 46, and feed pipe 37 into the end of the cylinder 34 at the left (Fig. 13) and against the piston 33 to push the piston inwardly towards the right in Figs. 5 and 13.

During this inward travel of the piston 33, the fluid pressure medium behind the piston (at the right in Fig. 13) returns to the pump 58 by way of the feed pipe 36, through the slide valve housing 38 at its end at the right (Fig. 13), branch return pipe 63 and main return pipe 59.

This forward movement of the piston 33 moves the pusher plate 31 forward into the outer open end of the carrier B and into contact with the containers A in the outer stack of the three stacks in the carrier and thus pushes all of the containers partially through the carrier a distance equal to the length of a container A. This forward movement continues until the innermost stack of containers A is pushed entirely out of the carrier through its inner open end. The forward movement of the piston 33 is then arrested so as to leave the pushed out stack of containers in an exposed position for further treatment during a continuing portion of the cycle of operation of the machine.

Arresting of the forward stroke of the piston 33 is effected by a timed energization of the cutoff valve solenoid 53. Energization of this solenoid 53 raises the cutoff valve 47 to the position shown in dotted lines in Fig. 13 and holds it in this raised position until the exposed stack of containers A have been disposed of. The raising of the cutoff valve 47 cuts off the entrance end of the feed pipe 37 and establishes communication between the feed pipe 56 and the branch return pipe 61 to cease feeding of the fluid pressure medium to the cylinder 34 and to return the unused medium to the main return pipe 59 and pump 58. In this manner the piston 33 and the pusher plate 31 connected thereto are advanced through partial strokes equal to the length of a container A.

As soon as the exposed stack of containers A have been disposed of, the cutoff valve solenoid 53 is deenergized and this permits the cutoff valve spring 48 to drop and return the cutoff valve 47 to its normal position at the bottom of the housing 46 as shown in Fig. 13. This dropping of the cutoff valve 47 reestablishes communication between the feed pipes 37, 56 and thus resumes circulation of the fluid pressure medium to the cylinder 34 to advance the piston 33 through another partial forward stroke to push out of the carrier B another stack of containers A and thus expose for further unloading the next in line stack.

In this manner, the piston 33 and the pusher plate 31 are advanced through partial strokes to remove from the carrier B and to position for further unloading, each stack in the carrier, in succession, until all of the containers have been removed from the carrier. At this point in the cycle of operation of the machine, the slide valve solenoid 42 (at the right of the valve housing 38 in Fig. 13) is momentarily energized and this shifts the slide valve 39 back into its normal position as shown in Fig. 13.

This shifting of the slide valve 39 cuts off communication between the supply pipe 57 and the feed pipe 56 and reestablishes communication between the supply pipe 57 and the feed pipe 36. This permits the fluid pressure medium to drain out of the cylinder 34 at the left in Fig. 13 and to enter at the right end and to thus push the piston 33 back through a single continuous return stroke to its normal position as shown in Fig. 13 in preparation for a repeat forward stroke during the next cycle of operation of the machine.

Each stack of containers A as it is pushed out of the inner open end of the carrier B to an exposed position for further unloading is received on a vertically movable table 71 (Figs. 5 and 6) and is pushed against a stop plate 72 to properly locate the containers on the table. The stop plate 72 is of rectangular configuration and covers an area substantially equal to the open end of the carrier B so as to cover all of the containers in the exposed stack. The plate 72 is held in a predetermined location relative to the table 71 during the partial forward strokes of the pusher 31 so as to provide a stop for the moving containers and to limit the stroke of the pusher 31.

At the termination of a partial forward stroke of the pusher 31, the stop plate 72 is retracted or moved slightly outward away from the exposed stack of containers to relieve any frictional engagement between the containers and the plate. This movement is just enough to clear the containers so that the plate still serves as a vertical guide for the containers. After removal of each row of containers in each stack, the plate 72 moves back into its stop position to properly locate the containers remaining in the stack, and after removal of the stack to locate the next stack advanced by the next partial stroke of the pusher 31.

Movement of the stop plate 72 preferably is effected by cam action. For this purpose the stop plate 72 is carried on the upper end of a vertical arm 74 (Figs. 1, 5 and 6) which at its lower end is secured to the outer end of a rectangular slide bar 75 slideably mounted in a horizontal slideway formed in a block 76 on an upright bracket 77 which extends up from the machine base plate 22. The inner end of the slide bar 75 carries a cam roller 78 which operates in a suitable cam groove 79 in a barrel cam 80 mounted on a cam shaft 81. The cam shaft 81 is journaled at one end in a bearing 81 in the bracket 77 and at the other end in a pair of spaced bearings 83, 84, in a bracket 85 which extends up from the base plate 22.

The cam shaft 81 is rotated through one revolution for each row of containers A in the stack received on the table 71 in order to dispose of the stack and then rests for one revolution to permit advancement of the next stack into position on the table. Since there are seven vertical rows of containers in each stack, the shaft 81 rotates seven times and then rests one, thus making eight cycles in all.

Rotation of the cam shaft 81 preferably is effected through a clutch device 87 (Figs. 5, 6 and 7) which comprises an inner cylindrical hub 88 keyed to the cam shaft 81 and a surrounding driving gear 89 which rotates freely on the shaft. The gear 89 is the main driving gear of the machine and is rotated continuously in any suitable manner as by an electric motor or the like. The driving gear 89 carries a spring pressed pawl 91 which is normally engaged in a notch 92 formed in the outer periphery of the hub 88 and thus provides a driving connection between the driving gear 89 and the cam shaft 81.

For releasing the cam shaft 81 from the driving gear 89 to permit resting of the shaft as mentioned above, the clutch pawl 91 is formed with a lug 93 which projects laterally beyond the clutch hub 88 and is engageable with the upper end of a pivotable clutch arm 94 mounted on a pivot pin 95 carried in lugs projecting from the bracket 85. The lower end of the clutch arm 94 is attached to a movable core 96 which extends through a normally deenergized electric solenoid 97 and beyond the solenoid is surrounded by a spring 98 which normally keeps the upper end of the arm 94 away from the path of travel of the pawl lug 93.

The clutch pawl 91 normally engaged in the clutch notch 92 drives the cam shaft 81 through seven rotations and just prior to completion of the seventh rotation, the solenoid 97 is energized to rock the upper end of the clutch arm 94 inwardly into the path of travel of the pawl lug 93. At the completion of the seventh rotation, the pawl lug 93 rides under the upper end of the clutch arm 94 and the pawl 91 is thus withdrawn from the notch 92. The shaft thereupon immediately stops rotation and the driving gear 89 makes one free revolution.

Before completion of this free revolution, the solenoid 97 is deenergized and the spring 98 thereupon withdraws the upper end of the clutch arm 94 from the path of travel of the pawl lug 93. The pawl 91 riding on the outer periphery of the hub 88 falls into the notch 92 and thus again drives the cam shaft 81 through another cycle of seven revolutions.

The energization and deenergization of the solenoid 96 is effected in time with the rotation of the driving gear 89 and through closing and opening of a normally open electric switch 101 (Figs. 6, 10 and 13). For this purpose the driving gear 89 is formed integrally with a pinion 103 (Figs. 4 and 6) which meshes with and drives a rotation reduction gear 104 mounted on a shaft 105 journaled in bearings 106 in the upright bracket 85. The ratio of pinion 103 to the gear 104 is 1 to 4.

The gear 104 is formed integrally with a pinion 108 which meshes with and drives a rotation reduction gear 109 which is mounted on a shaft 111 journaled in bearings 112 in the bracket 85. The ratio between the pinion 108 and the gear 109 is 1 to 2. Hence the ratio between pinion 103 and gear 109 is 1 to 8, i.e. pinion 103 makes eight rotations to one of the gear 109. This gear 109 carries a pin cam 115 (Fig. 10) which projects outwardly for engagement against a movable element 116 of the switch 101. The movable element 116 is of sufficient length to remain in contact with the pin cam 115 as the latter moves with the gear 109, to hold the switch 101 closed for its proper duration.

During the seven revolution cycle of rotation of the cam shaft 81, the containers A supported on the table 71 are removed one row at a time from the bottom of the stack of containers until the complete stack has been disposed of. This is effected, as hereinbefore mentioned, by a clamping of the containers above the lowermost row, a vertical movement of the table 71, and a longitudinal advancement of the lowermost row out from under the clamped containers above. All of these movements are effected by cams rotating with the cam shaft 81.

In this cycle of operations, the clamping of the containers above the lowermost row takes place first. The clamping of the containers is effected by a plurality of spring pressed pads 121 (Figs. 1, 4, 5 and 8) located adjacent the ends of the six rows of containers above the lowermost row of the stack resting on the table 71. There preferably are two vertical sets of the pads 121 at each end of the stack as shown in Fig. 5.

The pads 121 (Fig. 1) are formed with horizontal stems 122 which are slideably carried in vertically disposed wings 123 located one at each end of the stack. Compression springs 124 surrounding the stems 122 and interposed between the pads 121 and the wings 123 provide for yieldability of the pads. A head 125 on the outer ends of the stems 122 limit the inner travel of the pads.

The wings 123 are provided with arms 127 (Figs. 5 and 8) which are mounted on a pair of vertically disposed rocker shafts 128 located one on each side of the containers on the machine bed 23. The rocker shafts 128 are carried in bearings 129 formed in the bed 23 and thrust bearings 130 formed on the machine base plate 22. These rocker shafts 128 are rocked in opposite directions, periodically in time with the other moving parts of the machine to move the wings 123 inwardly simultaneously toward the ends of the rows of containers to clamp and hold the containers in the stack on the table 71 and at the proper time to swing away from the containers to release them. For this purpose the rocker shafts 128 below the bed 23 carry a pair of oppositely disposed arms 132 (see also Fig. 6).

The outer ends of the arms 132 are connected together by a diagonally disposed cross-link 133. One of the rocker shafts 128 carries a cam arm 135 which on its outer end carries a cam roller 136 (Fig. 5) which operates in a cam groove 137 of a barrel cam 138 mounted on and rotating with the cam shaft 81.

The cam shaft 81 through each revolution rotates the cam 138 through one cycle of operation and during this cycle the wings 123 are moved inwardly toward the ends of the containers in the six rows above the lowermost row to yieldably press the pads 121 against the end containers of each row and thus between them clamp the rows in place against downward movement. Following this clamping action the lowermost row of containers is removed and the containers above are then unclamped by a swinging away of the wings 123 and their pads 121 to permit lowering of the containers one row for a repeat operation. This lowering of the unclamped containers is effected by vertical movement of the table 71.

The table 71 (Figs. 5, 6 and 12) is a horizontally disposed elongated, rectangular box-like element of a width less than the length of the containers A supported thereon and of a length substantially equal to the length of one row of containers (as shown in the drawings nine containers). This table 71 extends along the front edge of the machine bed 23 in spaced relation thereto and in its normal vertical positon its top face is flush with the top of the bed 23 so that the stacks of containers can be readily pushed from the bed 23 across the space and onto the table. The top face of the table preferably is slotted to reduce frictional engagement with the containers.

The table 71 is supported on a pair of depending rods 141 (Figs. 5, 6 and 12) which are slideably carried in a pair of vertical slide bearings 142 formed in brackets 143 which extend downwardly and outwardly from the machine bed 23. Vertical movement of the table 71 is effected by a bifurcated bell crank 145 (Fig. 5) which is mounted on a pivot pin 146 carried in a pair of brackets 147 which depend from the machine bed 23. Horizontal arms 148 of the bell crank 145 are formed at their outer ends with slots 149 (Fig. 5) in which pins 150 operate. The pins 150 extend through vertical slots 151 in the slide bearings 142 and are secured in the table support rods 141. The bell crank 145 is also provided with a depending arm 152 (Fig. 5) which at its lower end carries a cam roller 153 which operates in a cam groove 154 of a barrel cam 155 mounted on and rotating with the cam shaft 81.

The cam groove 154 is so shaped and timed that during each rotation of the cam shaft 81, the bell crank 145 first lowers the table 71 slightly (about one half inch) to lower the lowermost row of containers A away from and thereby frictionally clear of the remainder of the stack which is held in clamped position as mentioned hereinbefore. In this lowered position of the table 71, the row of containers on the table rest on a pair of horizontally disposed, reciprocable feed bars 157 (Figs. 1, 2, 3, 5, and 6) disposed adjacent the vertical outer side walls of the table. The feed bars 157 are provided with a pair of feed fingers 158 which engage behind the row of containers and push it endwise, off the table 71 and out from under the other rows of containers held suspended by the clamping pads 121.

As soon as the moving lowermost row of containers is clear of the table 71 and while the feed bars 157 are moving back through a return stroke, the cam groove 154 lifts the table 71 up into engagement with the bottom of the stack of remaining clamped containers to provide a support for these containers. The containers are then unclamped and the table 71 is moved down to the level of the bed 23 (which is the normal position of the table) to locate the bottom row of the remaining rows of containers as a new lowermost row.

The containers above this new lowermost row are then again clamped against movement and the lowermost row is then moved further down to clear the clamped containers so that this new row can be removed by the next feeding stroke of the feed bars 157. It is in this manner that each row of containers in each stack is removed row-by-row to be advanced into position by the feed bars 157 and their fingers 158 to form a substantially continuous procession of containers.

The feed bars 157 operate in a pair of spaced and parallel grooves 161 (Figs. 1, 2, 3, 6, 11 and 12) formed longitudinally in the bottom of a horizontally disposed runway 162 disposed in endwise alignment with and forming a continuation of the vertically movable table 71. The runway 162 is stationary and extends out from the machine frame 21. Its outer end is supported by a bracket 163 attached to the frame 21. The upper edges of the feed bars 157 preferably extend above the top face of the runway 162 as best shown in Figs. 2 and 3 and are flush with the vertically movable table 71 when the table is in its lowermost position. Spaced and parallel guide rails 164 secured to the top of the runway 162 guide the moving containers and keep them in straight alignment.

The feed bars 157 are reciprocated through a feed stroke (toward the right in Figs. 1 and 6) and thence through a return stroke, by crank motion in time with the other moving parts of the machine. For this purpose the lower edges of a portion (at the left in Figs. 1 and 6) of the feed bars 157 are formed with rack teeth 166 (see also Fig. 11) which are meshed with a pair of gears 167 (Figs. 1 and 2) mounted under the feed bars 157 on a cross-shaft 168 carried in bearings 169 formed in the machine frame 21.

Disposed between the gears 167, the shaft 168 carries a pinion 171 which meshes with a segment gear 172 formed on the upper end of a vertically disposed arm 173. At its lower end the arm 173 is mounted on a pivot pin 174 (Fig. 4) carried in the machine frame 12 near the base plate 22. Intermediate its ends, the arm 173 is connected by a link 176 (see also Fig. 9) to a crank disc 177 which is formed integrally with a spur gear 178 mounted on a short shaft 179 journaled in a bearing 180 in the bracket 77 (see Figs. 5 and 9).

The gear 178 meshes with and is driven by a gear 181 of substantially the same size. The gear 181 is mounted on the cam shaft 81 for rotation therewith. Hence every time the cam shaft 81 makes one revolution, the crank disc 177 makes one revolution also and thus reciprocates the feed bars 157 through their feeding and return strokes for each row of containers in the stacks in the carrier B.

During a feed stroke of the feed bars 157 their feed fingers 158 engage behind the row of containers being removed from the table 71. However, during the return stroke of the feed bars, the fingers 158 are depressed below the feed line of the containers to clear the containers of the next row being lowered into feeding position by the table 71. For this purpose the fingers intermediate their lengths are mounted on pivot pins 184 (Figs. 11 and 12) carried in the feed bars 157. The fingers 158 extend below the feed bars 157 and carry cam rollers 185 which operate in stationary cams 186 (see also Figs. 1, 5 and 6) secured in spaced and parallel horizontal relation in the brackets 143, on opposite sides of the table 71. Each of the cams 186 are formed with a pair of vertically spaced and parallel cam grooves 187, 188 which extend longitudinally of the cams for a distance slightly greater than the length of the table 71.

At their ends, the cam grooves 187, 188 are joined by communicating angularly disposed grooves 189, 190 which direct the cam rollers 185 from a groove at one level to the other groove at another level. Adjacent the angular groove 190, the cams 186 are provided with a switch gate 191 (Figs. 11 and 12) having one end located between the grooves 187, 188 and mounted on a pivot pin 192. The pins 192 extend through the bracket 143, and outside portions of the supporting bracket are secured to arms 194 yieldably held under tension by springs 195. One end of each spring is connected to the arms 194 while the opposite ends are connected to pins 196 which project out from the cams 186. The springs 195 yieldably hold the cam gates 191 in the position shown in Fig. 11.

Hence during a feeding stroke (toward the right as viewed in Figs. 1 and 11) of the feed bars 157 the cam rollers 185 of the feed fingers 158 traverse the lower cam groove 187 of the cams 186 and thus retain the feed fingers 158 in feeding position as shown in Fig. 11. At the end of the feeding stroke, the cam rollers 185 ride under and past the lower free ends of the cam gates 191 to the position shown in Fig. 11.

Hence at the beginning of the return stroke of the feed bars 157 the cam rollers 185 ride up along the upper edges of the cam gates 191 and thus are directed upwardly into the upper level cam groove 188. This action pivots the feed fingers 158 and thus depresses their upper feeding ends to a level below the top edges of the feed bars so that the fingers are clear of the containers being lowered into feeding position by the table 71. The feed fingers 158 remain in this depressed position during the entire return stroke.

Upon reaching the end of this return stroke, the cam rollers 185 ride down along the angularly disposed cam grooves 189 (Fig. 1) and thus enter the lower cam groove 187 for a repeat feeding stroke. This latter action pivots the feed fingers 158 upwardly so that they are in feeding position behind the newly located row of containers resting on the table 71 and feed bars 157 in readiness for a feeding stroke of the bars as described above.

The rows of containers A, as they are removed from the table 71 by the feed bars 157 are received in the runway 162 and each new row pushes a previously removed row along the chute to a continuously moving conveyor belt 198 (Figs. 1, 4 and 6) which carries the containers in substantially continuous processional order to the filling machine. The belt 198 operates over a pulley 199 mounted on a shaft 201 journaled in bearings formed in a bracket 202 which may be a part of the chute 162 or a part of the filling machine.

As each row of containers A is pushed by the feed fingers 158 onto the runway 162 it is held against moving back with the fingers by a latch 205 (Figs. 1 and 8) having a hooked end which engages over the last container in the received row. This latch rides on top of the containers through virtue of its own weight. The latch is mounted on a pivot pin 206 carried in bearings 207 which extend up from the guide rails 164 on the runway. An arm 208 (Fig. 8) on the latch is engageable with the side of one of the bearings 207 to limit the downward travel of the latch.

Reference should now be had to wiring diagram in Fig. 13 for an explanation of the electric apparatus of the machine. In starting a cycle of operation of the machine, as hereinbefore mentioned, the pusher plate 31 is first moved forward (toward the right in Fig. 13) through a partial stroke through operation of the fluid pressure cylinder 34 and piston 33 to locate the innermost stack of containers A on the table 71. This movement of the pusher plate 31 is effected through a shifting (toward the left in Fig. 13) of the slide valve 39 by energization of the solenoid 41. The energization of the solenoid 41 is effected through an electric circuit which includes a source of electric current such as a generator 211 and a normally open, electric switch 212 which is momentarily closed by cam action only once at the beginning of the cycle of unloading an entire carrier B.

The closing of the switch 212 is effected by an edge cam 214 (Figs. 6, 13 and 14) the outer periphery of which is engaged by a movable element 215 of the switch 212. This outer periphery of the cam 214 is formed with a notch 217 (Fig. 14) into which the movable element falls to obtain instant closing of the switch as soon as the cycle starts. The cam 214 is mounted on and rotates with a shaft 218 (Figs. 1, 4, 5, 6, and 7) journaled in a bearing 219 in the bracket 85.

The shaft 218 is rotated continuously in time with the other moving parts of the machine by a gear 221 (Figs. 5, 7 and 13) which is mounted on the shaft and which meshes with and is driven by a pinion 222 mounted on the shaft 111. The gear shaft 218 makes one revolution for each carrier B. Since in the preferred form of the machine as shown there are three stacks of containers in the carrier, the ratio between the pinion 222 to the gear 221 is 3 to 1.

A second edge cam 224 is carried on the shaft 218 for returning the pusher plate 31 at the completion of the cycle of operation of unloading a carrier B. The cam 224 is formed with a peripheral notch 225 (Fig. 14) for closing a normally open, electric switch 226 which will be explained more fully hereinafter.

The closing of the switch 212 by the cam 214 establishes a circuit which causes electric current to flow from the generator 211 along a wire 231 to and through the solenoid 41, a connecting wire 232 to and through the closed switch 212 and a connecting wire 233 returning to the generator. Current flowing along this circuit momentarily energizes the solenoid 41 and shifts the slide valve 39 into place to direct the fluid pressure medium into the cylinder 34 at the left in Fig. 13 as hereinbefore described. This causes the pusher plate 31 to push the entire contents of the carrier B inwardly a distance equal to the length of a container A until the innermost stack of containers engages and stops against the stop plate 72 to locate this stack over the table 71.

In order to relieve the pressure on the pusher plate 31 while the innermost stack of containers is being unloaded, the cutoff valve 47 is raised by energization of the electric solenoid 53 as hereinbefore mentioned. Energization of the solenoid 53 is controlled by an electric circuit which contains a normally open cutoff switch 235 (Fig. 13) and a normally open holding relay 236 actuated by normally deenergized solenoid 237. The cutoff switch 235 is disposed in the path of travel of a pin 238 which projects out from a bracket 239 (see Fig. 8) attached to the pusher plate 31. The pin 238 engages and momentarily closes the switch 235 as it passes the switch just prior to engagement of the innermost stack of containers with the stop plate 72.

The momentary closing of the cutoff switch 235 establishes the circuit and causes electric current from the generator 211 to flow along wire 231 to and along a connecting wire 241, through the cutoff solenoid 53, a connecting wire 242 to and through the momentarily closed cutoff switch 235, a connecting wire 243 to and through the relay solenoid 237, a connecting wire 244 to and through the normally closed slide valve switch 226, a connecting wire 245 to and through a normally closed release switch 246, a wire 247 and wire 233 returning to the generator. Current flowing along this circuit energizes the cutoff valve solenoid 53 which raises the cutoff valve 47 and thus temporarily arrests the forward movement of the piston 33 and the pusher plate 31. This current also energizes the relay solenoid 237 and closes the relay 236 to by-pass the current around the cutoff switch 235, along wires 249, 251 to hold the cutoff valve solenoid 53 energized and thus hold the pusher plate 31 stationary after the cutoff switch 235 opens.

With the pusher plate 31 stationary and the innermost stack of containers A located on the table 71, the stage is set for the beginning of the seven-revolution cycle of the cam shaft 81 controlled by the clutch 87 to actuate the table 71, the stop plate 72, the clamp pads 121, and the feed bars 157 to unload the containers row-by-row as hereinbefore mentioned. This seven-revolution cycle is initiated by release of the clutch arm 94 which during the preceding portions of the machine cycle holds the clutch pawl 91 in declutched or released position.

Release of the clutch arm 94 to cause the clutch 87 to engage and rotate the cam shaft 81 is effected by deenergization of the clutch solenoid 97 which has been held energized through a circuit including a source of electric current such a generator 254 (Fig. 13) having a wire 255 to the solenoid 97, a wire 256 to the closed switch 101 and a wire 257 which connects the switch 101 to the generator 254. The switch 101 is controlled by the cam pin 115 on the gear 109 as hereinbefore mentioned. At this time in the machine cycle the cam pin 115 opens the switch 101 and thus breaks the circuit and deenergizes the clutch solenoid 97. The spring 98 thereupon shifts the clutch arm 94 out of the path of the clutch pawl lug 93 and permits the clutch to rotate the cam shaft 81 through its seven-revolution cycle.

Just before the completion of the seven-revolution cycle, which is during the period in which the last row of the stack of containers on the table 71 is being removed from the table, the cam pin 115 closes the clutch switch 101 and thus reenergizes the clutch solenoid 97 to shift the clutch arm 97 into position to declutch the clutch 87 at the end of the seventh revolution of the cam shaft 81 to cause the shaft to rest during an eighth revolution of the continuously rotating clutch. There is one of these eight-revolution cycles of the clutch for each stack of containers.

Immediately following this action, the switch 246 in the cutoff valve holding circuit is momentarily opened to break the holding circuit by deenergizing the relay solenoid 237 and opening the relay 236 and thus deenergize the cutoff valve solenoid 53. Opening of the switch 246 is effected by a cam-pin 261 (Figs. 6, 10 and 13) disposed adjacent the cam-pin 215 on the gear 109.

The deenergization of the cutoff valve solenoid 53 releases the cutoff valve 47 and causes it to return to its normal position thereby permitting the fluid pressure medium to again enter the cylinder 34 (at the left in Fig. 13) and push the pusher plate 31 through another partial stroke to locate the next or second stack of containers in place on the table 71. This partial stroke of the pusher plate 31 is terminated at the proper time and in the same manner, by a reestablishment of the cutoff valve circuit but through the closing of a second normally open cutoff switch 263 disposed in the path of travel of the cam-pin 238 on the pusher plate (see Figs. 8 and 13).

The second cutoff switch 263 is connected by a wire 264 to the wire 249 of the circuit and by a wire 265 to the wire 251. Hence when this switch is closed it reestablishes the cutoff valve circuit and energizes the cutoff valve solenoid 53 to raise the cutoff valve 47 into cutoff position and also energizes the relay solenoid 237 to close the relay 236 and thereby hold the circuit energized until again broken by the opening of the switch 246 upon complete removal of the containers in the second stack.

In a similar manner the third partial stroke of the pusher plate 31 is arrested upon delivery of the third and last stack of containers onto the table 71 for unloading. This is effected by a third normally open cutoff switch 267 (Figs. 8 and 13) which is connected by a wire 268 to the wire 249 and by a wire 269 to the wire 251 of the cutoff valve circuit. Closing of this switch 267 reestablishes the cutoff valve circuit and energizes the cutoff valve solenoid 53 to raise the cutoff valve 47 to cut off position and to energize the relay solenoid 237 to close the holding relay 236 to hold the cutoff valve 47 in position in the same manner as hereinbefore explained in connection with the partial movements of the pusher plate 31 for the first and second stacks of containers.

Upon complete removal of the containers in the last stack, row-by-row, and while the last row is being removed from the table 71, the cutoff valve circuit is momentarily broken a little before its usual time through an opening of the switch 226 actuated by the edge cam 224 on the shaft 218. This returns the cutoff valve 47 to its normal position. Simultaneously with the opening of the switch 226 its contacts momentarily close against other contacts 270 which connect with the slide valve solenoid 42. Electric current while being disconnected from the cutoff valve circuit, thus flows from the generator 211 along wire 231 to a wire 271, to and through the slide valve solenoid 42, a connecting wire 272 which connects with the switch contacts 270, a wire 273, and wire 233 returning to the generator 211. Current flowing along this circuit energizes the slide valve solenoid 42 and thus causes the slide valve 39 to shift back into its normal position as shown in Fig. 13.

Shifting of the slide valve 39 to its normal position changes the direction of flow of the fluid pressure medium so that it enters the cylinder 34 at the right as viewed in Fig. 13. This pushes the piston 33 back in one continuous stroke to its normal position as shown in Fig. 13 and thus retracts the pusher plate 31 to its normal position for the reception of a new carrier B and a repeat unloading cycle as explained hereinbefore. This completes the cycle of operation of the machine.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A machine for unloading containers arranged in a compact unit of a plurality of juxtaposed parallel vertical stacks of single rows of containers, comprising in combination a support for a said unit of containers; a table for receiving a said vertical stack of containers from said support and mounted adjacent said support for substantially vertical movement between a raised position substantially coplanar with said support and a lowered position; pusher means disposed adjacent said support for pushing the entire unit of containers toward said table to deliver individual vertical stacks of single rows of containers progressively from said unit onto said table and in vertical alignment therewith while the table is in said raised position; opposed clamp members terminating in pads engageable against the outermost container walls at opposite ends of each row above the bottom row of containers on the table, said clamp members being yieldably mounted in a pair of clamp wings movable inwardly and outwardly in unison, respectively toward and away from the ends of the rows of containers in the said stack in alignment with said table to yieldably clamp between opposing pads and hold in suspension all of the rows of containers above the bottom row in said stack; feeding means adjacent said table for advancing said containers horizontally from the table while it is in lowered position; and means for actuating said pusher means, clamp wings, table and feeding means in synchronism whereby said clamp members are moved away from the containers when said table is in its raised position to release the vertical stack to said table, and said clamp members are moved toward and into engagement against the containers above the lowermost row before said table reaches its lowered position.

2. A machine for unloading containers arranged in a compact unit of a plurality of juxtaposed parallel vertical stacks of single rows of containers, comprising in combination a support for said unit of containers; a table mounted adjacent said support for substantially vertical movement between raised and lowered positions; a reciprocable pusher plate disposed adjacent said support for pushing the entire unit of containers toward said table to deliver individual vertical stacks of single rows of containers progressively from said unit to alignment with said table; a fluid pressure mechanism for actuating said plate, said mechanism including a cylinder, a piston housed in said cylinder and connected with said plate, a slide valve and conduits connecting with the ends of said cylinder for directing a fluid pressure medium against opposite faces of said piston to reciprocate said pusher plate through a pushing stroke and a return stroke, a cutoff valve in the conduits for alternately connecting said slide valve with one end of said cylinder and with a bypass to the source of said fluid pressure medium to effect partial movements of said pusher plate through its pushing stroke, each of said partial movements being of a length equal to the distance traveled to position each vertical stack of containers individually on said table, and control means actuated by said pusher plate and connecting with said cutoff valve to control the actuation of said cutoff valve to make said alternate connections with said slide valve and said by-pass and thereby effect said partial movements of the pusher plate; clamp members operable against the opposite end containers in at least the row above the lowermost row in the stack on said table to hold all the containers above the lowermost row against displacement; feeding means adjacent said table for removing said separated row of containers from said table; and means for actuating said fluid pressure mechanism, said table and said feeding means in synchronism, whereby all rows of containers above the lowermost row in each vertical stack fed by said plate to said table are held between said clamp members before said lowermost row is moved by said table to its lowered position and removed therefrom by said feeding means.

3. A machine for unloading containers arranged in a compact unit of a plurality of juxtaposed parallel vertical stacks of single rows of containers, comprising in combination a support for a said unit of containers; a table mounted adjacent said support for substantially vertical movement between a raised position, substantially coplanar with said support, and a lowered position; pusher means disposed adjacent said support for pushing the unit of vertical stacks toward said table to deliver individual vertical stacks of single rows of containers progressively from said unit onto said table and in vertical alignment therewith; a movable abutment for intermittently engaging and locating all containers in each stack as the stack is advanced onto said table by said pusher means and during subsequent unloading of the stack; opposed clamp members engageable against the outermost container walls at opposite ends of at least the row above the bottom row of containers on the table; feeding means adjacent said table for advancing said containers horizontally therefrom while the table is in said lowered position; and means for actuating said pusher means, abutment, clamp members, table and feeding means in synchronism whereby said clamp members are moved outwardly and said abutment is moved into locating engagement with the stack whenever said table is in raised position and said clamp members are moved inwardly against the containers above the lowermost row before said table reaches said lowered position and before said feeding means advance the containers from the table.

4. A machine for unloading containers arranged in a compact unit of a plurality of juxtaposed parallel vertical stacks of single rows of containers, comprising in combination a support for a said unit of containers; a table for receiving a said vertical stack of containers from said support and mounted adjacent said support for substantially vertical movement between a raised position, substantially coplanar with said support, and a lowered position; a vertically disposed stop plate mounted for substantially horizontal reciprocation toward and away from said table and a said stack of containers thereon for locating and guiding a said stack relative to said table; pusher means disposed adjacent said support for pushing the entire unit of containers toward said table to deliver individual vertical stacks of single rows of containers progressively from said unit onto said table and in vertical alignment therewith; opposed clamp members terminating in pads engageable against the outermost container walls at opposite ends of each row above the bottom row of containers on said table, said clamp members being yieldably mounted in a pair of clamp wings movable outwardly and inwardly in unison, respectively toward and away from the ends of the rows of containers in the said stack in alignment with said table to yieldably clamp between opposing pads and hold in suspension all of the rows of containers above the bottom row in said stack; feeding means adjacent said table for advancing said containers horizontally from the table while it is in lowered position; and means for actuating said pusher means, stop plate, clamp wings, table and feeding means in synchronism, whereby said clamp members are moved outwardly when said table is in raised position and said clamp members are moved inwardly into engagement against the containers above the lowermost row before said table reaches its lowered position.

References Cited in the file of this patent

UNITED STATES PATENTS

| | | |
|---|---|---|
| 1,330,639 | Leumann | Feb. 10, 1920 |
| 1,655,325 | Mitchusson et al. | Jan. 3, 1928 |
| 1,711,647 | Milmoe | May 7, 1929 |
| 1,981,467 | Radtke | Nov. 20, 1934 |
| 2,050,711 | Malocsay | Aug. 11, 1936 |
| 2,180,163 | Milmoe | Nov. 14, 1939 |
| 2,187,568 | Gurley | Jan. 16, 1940 |
| 2,253,482 | Forsthoefel | Aug. 19, 1941 |
| 2,553,683 | Smith | May 22, 1951 |
| 2,664,216 | Johnson | Dec. 29, 1953 |
| 2,702,132 | Van Doren | Feb. 15, 1955 |
| 2,705,100 | Paxton | Mar. 29, 1955 |
| 2,815,874 | Kowal | Dec. 10, 1957 |

FOREIGN PATENTS

| | | |
|---|---|---|
| 52,190 | Germany | May 27, 1890 |